Sept. 19, 1939.  T. G. MYERS  2,173,339
GEARED POWER UNIT
Filed Jan. 7, 1935  4 Sheets-Sheet 2

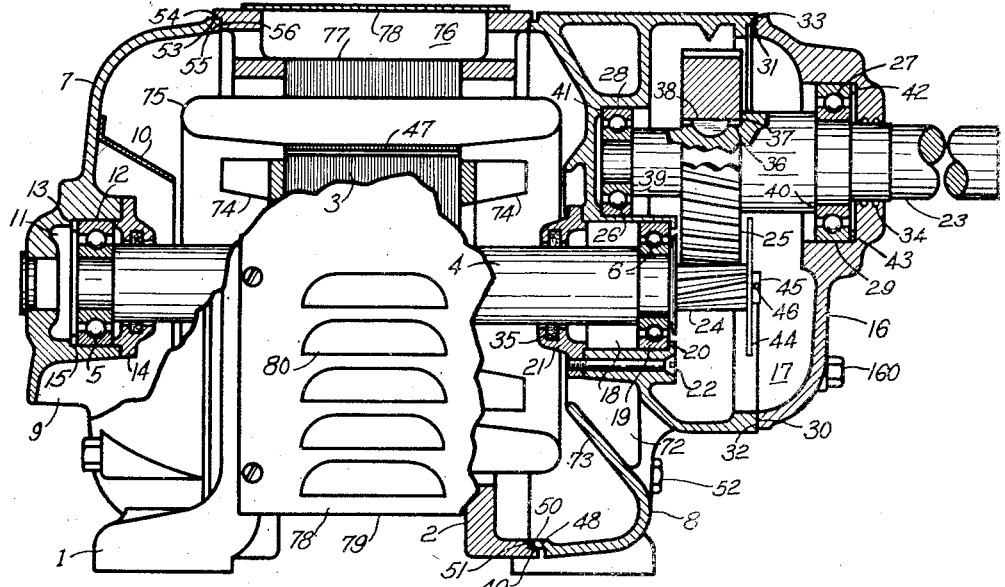

Thomas G. Myers INVENTOR

BY John Flam

ATTORNEY

Sept. 19, 1939.   T. G. MYERS   2,173,339
GEARED POWER UNIT
Filed Jan. 7, 1935   4 Sheets—Sheet 3

Thomas G. Myers INVENTOR
BY John Flam
ATTORNEY

Sept. 19, 1939. T. G. MYERS 2,173,339
GEARED POWER UNIT
Filed Jan. 7, 1935 4 Sheets-Sheet 4

Thomas G. Myers INVENTOR
BY John Flam
ATTORNEY

Patented Sept. 19, 1939

2,173,339

UNITED STATES PATENT OFFICE 2,173,339

GEARED POWER UNIT

Thomas G. Myers, Los Angeles, Calif., assignor to U. S. Electrical Motors, Inc., a corporation of California Application January 7, 1935, Serial No. 727

1 Claim. (Cl. 74—421)

This invention relates to a self-contained gear power unit, and more particularly to an integral construction incorporating an electric motor drive, transmission gearing interposed between the motor and a load driving shaft, and a common supporting means for the entire unit.

Alternating current is used as a source of power supply in a majority of electric power installations. The speed at which an alternating current motor operates is a function of the frequency of the power system and of the number of poles for which the motor is wound. Thus where a motor is driven from a constant frequency, alternating current, source of power supply, the number of available motor speeds is limited to the number of poles for which the motor may be wound. For a given power capacity the weight and size of an electric motor increases with the number of poles. It is thus advantageous to employ relatively high speed electric motors having few poles. Consequently the choice of driving speeds which can be obtained economically at the motor shaft is limited. The speed required at the load driving shaft is, however, a function of the connected load and not of the source of power supply. It is therefore advantageous to employ a geared power unit in which gearing is interposed between the motor shaft and the load driving shaft.

It is accordingly an object of this invention to provide an electrically driven geared power unit, in which the electric motor may be operated at its optimum speed and in which the ratio of the transmission gearing may be varied over a wide range of values to obtain a wide range of speeds at the load driving shaft.

For a constant power capacity the torque delivered at the load driving shaft of the geared power unit varies inversely as the speed of the load driving shaft. Consequently, in geared power installations the torque developed at the load driving shaft may have an extremely large value even when motors of relatively low horse power capacity are employed. This torque produces a reactive torque tending to distort the supporting structure of the gearing and of the driving electric motor. The successful operation and life of transmission gearing are dependent on the ability of the supporting structure to maintain the gearing in correct power transmitting relation. Distortion of the supporting structure produces a relative displacement of the gearing members which prevents the proper mating of the gear teeth, and thereby increases the wear and stress on the gear teeth.

It is accordingly still another object of this invention to provide a geared power unit in which positive and adequate means are provided for supporting the gearing members, whereby the mating gears are maintained in accurate alignment and at the correct center distance during the operation of the geared power unit in a power transmitting capacity, and in which the relative locations of the component elements are determined by means of accurately formed supporting surfaces and not by trial.

It is still another object of this invention to provide a geared power unit in which adequate means are provided for ventilating the driving electric motor.

It is still another object of this invention to provide adequate lubricating means for the gear members.

In order to provide a compact power unit having a large power capacity in proportion to its weight it is necessary to utilize the maximum power capacity of the gearing. This requires that the gears be mounted in accurate alignment and at the correct center distance. During the machining of the gear case it is extremely difficult to take measurements which will establish the positions at which the supporting surfaces of the bearing structure should be machined, in order that the axes of the mating gears will be maintained in correct parallel relation. This difficulty may be obviated by so constructing the geared power unit that a master plate may be employed, on which the gear housing may be supported while it is being machined. This master plate is provided with means for locating it with respect to the cutting machine, so that the bearing locating surfaces on the supported gear housing will be machined at the locations required to maintain the axes of the mating gears parallel and at the correct center distance.

It is accordingly another object of this invention to provide a geared power unit in which the bearing locating surfaces of mating gears may be formed in the required relative position by supporting the gear housing on a master plate or jig while these surfaces are being formed, and in which the bearing locating surfaces for each of the gear members may be formed at a single setting of the gear housing in the cutting machine.

It is still another object of this invention to provide a geared power unit in which each of the gearing elements together with its supporting means may be removed as a unit from the assembly of the geared power unit.

This invention possesses many other advantages and has other objects which may be made more easily apparent from a consideration of several embodiments of the invention. For this purpose there are shown a few forms in the drawings accompanying and forming a part of the present specification. These forms will now be described in detail, illustrating the general principles of the invention; but it is to be understood that this detailed description is not to be taken in a limiting sense, since the scope of the invention is best defined by the appended claim.

Referring to the drawings:

Figure 1 is a side elevation of a geared power unit incorporating the invention. This view is partly in section, taken along the axis of the motor shaft, and illustrates the cooperation of the gearing elements, the supporting structure, and the driving electric motor.

Figure 2 is an end elevation of the geared power unit of Figure 1, taken from the right hand side with the cover of the gear housing, the load driving shaft and the oil slinger removed. This view illustrates the interior of the gear housing and the means provided for determining the coaxial relation of the bearing supports of the load driving shaft.

Figure 3 is a detailed view of the motor shaft of the geared power unit of Figure 1, illustrating the means provided for forming the driving connection between the motor shaft and the driving gear of the geared transmission.

Figure 4:
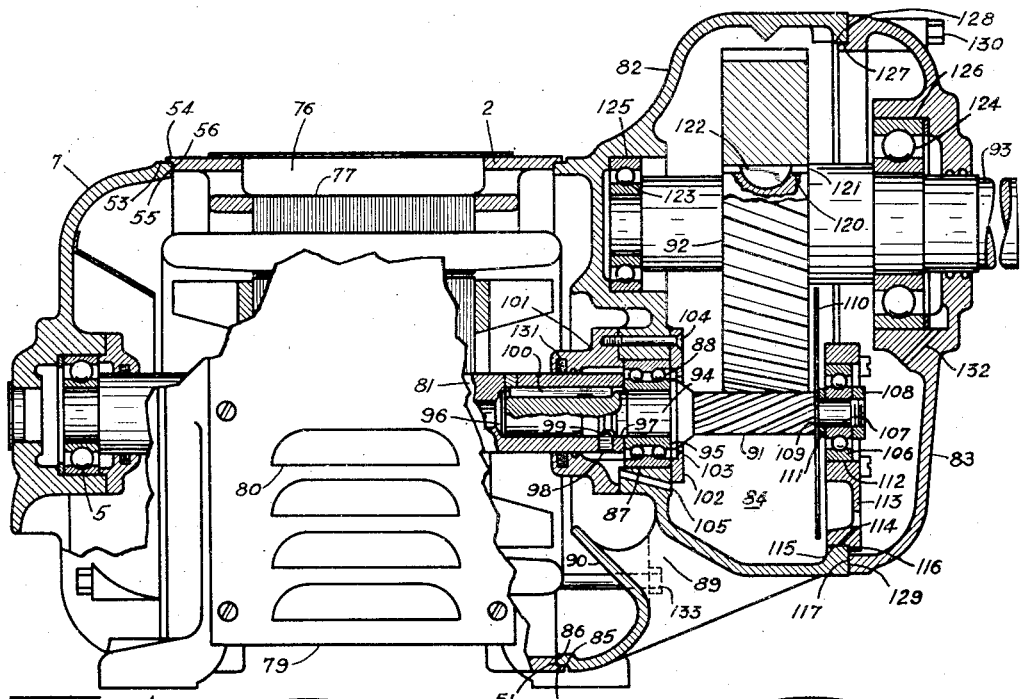
Figure 4 is a side elevation of another form of the geared power unit. This view is partly in section, taken along the axis of the motor shaft, and illustrates the relation of the gearing elements, the means for rotatably supporting the gears, and the construction of the driving electric motor.

Referring to Figure 1: the geared power unit is provided with the driving electric motor 1, having the stator 2, and the rotor 3 mounted on the motor shaft 4. The motor shaft 4 is rotatably supported by means of the bearings 5 and 6, which are respectively supported on the end brackets 7 and 8. The end bracket 7 may be of a type commonly employed in standard motor construction and may be provided with the downwardly directed air intake passage 9 and the air deflector 10 for the motor ventilation. Bearing 5 is supported on end bracket 7 by the bearing housing 11 formed by the internal cylindrical surface 12 and the shoulder 13 formed on the end bracket and the bearing cap 14. To accurately fix the position of the bearing in the bearing housing, the spacer members 15 may be provided between the bearing and the shoulder 13. By employing several shims for the spacer members 15, the axial position of the bearing may be fixed within a few thousandths of an inch.

The end bracket 8 is of special construction and together with the removable cover 16 form the gear housing 17. However, the member 8 may be formed to fit the standard stator dimensions, so that the positions of the brackets 7 and 8 may be changed with respect to the stator 2. Bearing 6 is supported on the end bracket 8 within the bearing housing 18 formed by the internal cylindrical surface 19 and the shoulder 20 formed on member 8 and the bearing cap 21. The bearing cap 21 is secured to the member 8 by means of screws 22, which pass through the wall of member 8, and which are threaded into the bearing cap 21.

To provide the reduction in speed between the motor shaft and the load driving shaft 23, the motor shaft has mounted thereon the driving pinion 24, which is in driving relation to the driven gear 25, mounted on the load driving shaft. The gears 24 and 25 may be formed with the helix angle required by the gear diameters and the motor speed. The driving connection, which is provided between the driving gear 24 and the motor shaft, will be described in detail in connection with Figure 3.

The load driving shaft 23 is rotatably supported by means of the bearings 26 and 27, which are respectively supported by the internal cylindrical surfaces 28 and 29, formed in the member 8 and in the removable cover 16 of the gear housing. To insure the coaxial relation of the cylindrical surfaces 28 and 29, the removable cover 16 is located with respect to the gear housing by the contact of the radial surface 30 and the external cylindrical surface 31, formed on the removable cover, with the radial surface 32 and the internal cylindrical surface 33, formed on the housing member 8. The cover is suitably secured to the housing by means of the bolts 160 which pass through the cover and are threaded into the housing member.

By means of the construction provided, lubricant may be easily retained within the gear housing. The contact of the radial surfaces 30 and 32 serves to prevent leakage between the cover and the gear housing. The removable cover is provided with the lubricant retaining groove 34 adjacent to the load driving shaft and the bearing cap 21 is provided with the lubricant retaining seal 35 for preventing the escape of lubricant into the motor structure.

The external cylindrical surface 31, formed on the removable cover, is formed coaxial with the bearing supporting surface 29 and the internal cylindrical surface 33, on the gear housing, is formed coaxial with the bearing supporting surface 28. Thus by the concentric relation of the mating cylindrical surfaces 31 and 33, the cylindrical bearing supporting surfaces 28 and 29 are accurately and adequately maintained in coaxial relation to positively determine the axis of rotation of the load driving shaft and of the supported gear.

To insure that the cylindrical surfaces 29 and 31 of the removable cover are in fact formed in coaxial relation, these surfaces may be formed at a single setting of the cover 16 in a lathe or boring mill, and the radial surface 30 may be formed at the same time to insure the perpendicular relation of this surface to the cylindrical surfaces. The coaxial relation of the cylindrical surfaces 28 and 33, formed on the bearing housing, is best illustrated by Figure 2, which is an end view taken from the right hand side of Figure 1 with the cover 16 and the load driving shaft 23 removed. The coaxial relation of the cylindrical surfaces 28 and 33 may also be insured by forming these surfaces at a single setting of the gear housing in a lathe or boring mill, at which time, the radial surface 32 may also be formed.

To positively fix the position of the driven gear 25 with respect to the load driving shaft 23, the gear is pressed on to the external cylindrical surface 36 and against the shoulder 37, formed on the load driving shaft. A suitable driving connection may be formed between the gear and the load driving shaft. In the present instance the circular key 38 is provided, which is secured in a keyway formed in the shaft and which engages a keyway formed in the gear. By this construction the key is effectively locked in position and prevented from travelling axially with respect to either the gear or the shaft. The bearing 26 is pressed on to the load driving shaft 23 and against the shoulder 39 formed on this member. The bearing 27 is likewise pressed on to the load driving shaft and against the shoulder 40. The axial movement of the shaft and of the associated gear and bearings is limited in one direction by means of the shoulder 41 formed on the member 8, which engages the bearing 26 and in the opposite axial direction by means of the shoulder 42, formed on the removable cover, and which engages the bearing 27. In order to accurately determine the axial position of the load driving shaft, spacer means 43 may be provided between the shoulder 42 formed on the removable cover and the bearing 27. In this manner the axial position of the shaft and of the gear 25 may be limited within a few thousandths of an inch without the necessity of machining either the housing member 8 or the cover to these narrow tolerances.

To provide lubricant for the gears the oil slinger 44 is provided, which is removably secured to the end 45 of the driving gear. The oil slinger may be suitably held in place by means of the cotter pin 46, which passes through the end 45 of the driving gear.

In order to maintain the driving and driven gears in accurate alignment and at the correct center distance during the operation of the geared power unit, means are provided for rigidly securing the housing member 8 to the stator, so that the axis of the driving gear 24 is coaxial with the bore 47 of the stator. To insure the coaxial relation of the driving gear with the stator, the member 8 is provided with the external cylindrical surface 48, formed coaxial with the bearing supporting cylindrical surface 19, and which engages or mates with the internal cylindrical surface 49, formed on the stator coaxial with the stator bore 47. The axial position of the gear housing with respect to the stator is determined by the contact of the radial surfaces 50 and 51, formed respectively on the member 8 and on the stator. Suitable means may be provided for maintaining the surfaces 50 and 51 in contact. In the present instance bolts 52 are provided, which pass through the member 8 and which are threaded into the stator 2. The bracket member 7 which supports the bearing 5 is also provided with an external cylindrical surface 53, which engages or mates with the internal cylindrical surface 54 formed on the stator. This member is also provided with the radial surface 55, which engages the radial surface 56 formed on the stator.

To insure the coaxial relation of the external cylindrical surface 53 with the bearing supporting surface 12 and the perpendicular relation of the radial surface 55 to these cylindrical surfaces, each of these surfaces may be formed at a single setting of the member 7 in a lathe or boring mill. To insure the coaxial relation of the cylindrical surfaces 49 and 54 with the stator bore 47, these surfaces may be formed as follows: The stator bore may be first ground to the required diameter and then the stator may be mounted on an arbor which engages the stator bore, after which, the surfaces 49 and 54 as well as the radial surfaces 51 and 56 may be formed with the stator so supported. It is thus obvious from the construction that the relative position of the driving and driven gears is accurately determined by the supporting structure, and that means are provided whereby these gears will be maintained in the required relative position during the active operation of the geared power unit in a power transmitting capacity.

The driving connection formed between the motor shaft and the driving gear is illustrated by Figure 3. Referring to this figure: The driving gear 24 is provided with the shank 57, which has an external cylindrical surface formed thereon coaxial with the gear 24 and which projects into the chamber 58 formed in the motor shaft. The driving gear 24 is accurately located in coaxial relation to the motor shaft by the contact of the shank 57 with the internal cylindrical surface 59, formed within the chamber 58 coaxial with the motor shaft. The diameter of the shank adjacent to the driving gear 24 may be made slightly greater than the diameter of the remaining portion of the shank so that a press fit is formed between the end of the motor shaft and the shank 57, thereby maintaining the driving gear in accurate coaxial relation to the supporting bearing 6, even when the gear is heavily loaded.

To form the driving connection between the pinion shank 57 and the motor shaft, the key 60 is provided, which engages the keyway 61 formed in the motor shaft and the keyway 62 formed in the pinion shank. The key 60 is preferably made relatively flat so that the depth of the keyways 61 and 62 is small in comparison to their width. To form the keyway 61 in the motor shaft, the hole 63 may be drilled through the motor shaft into the chamber 58, after which, the keyway 61 may be cut by means of a shaper tool which travels between the end of the motor shaft and the hole 63. After the keyway 61 has been formed the hole 63 may be provided with a suitable plug.

The axial position of the driving gear with respect to the motor shaft may be determined by means of the spacer member 65 interposed between the gear and the end of the motor shaft. The spacer member 65 also serves to maintain the bearing 6 in fixed axial position with respect to the motor shaft. The member is also provided with a flared portion 66 which projects almost to the shoulder 20, thereby preventing the entrance of excessive lubricant into the bearing housing. To preclude the possibility of lubricant accumulating within the bearing housing and thereby escaping along the motor shaft into the motor structure, the oil returning grooves 67 are provided on the internal periphery of the bearing housing. The oil returning grooves 67 conduct the lubricant past the bearing to the holes 68, through which the lubricant is returned to the gear housing. As illustrated by Figure 2, a plurality of the grooves 67 and holes 68 may be provided, so that the lubricant may be returned to the gear housing irrespective of the particular position in which the geared power unit is mounted.

In order to prevent the pinion shank from pulling away from the motor shaft the pinion shank is provided with the conical shoulder 69 and the motor shaft is threaded to engage the set screw 70, which passes through the motor shaft and which engages the conical head 69 of the pinion shank. As the set screw 70 is screwed into position the head of the screw urges the conical shoulder 69 and the pinion shank in an axial direction to draw the pinion shank farther into the motor shaft, thereby bringing spacer member 65 into contact with the bearing 6 mounted on the end of the motor shaft and thus accurately fixing the axial position of the pinion. In order to remove the pinion from the motor shaft, the set screw 70 may be withdrawn and the pinion shank may then be driven out of the chamber 58 by means of a suitable rod inserted through passage 71 from the opposite end of the motor shaft.

The construction illustrated by Figure 3 may be employed with driving gears having a diameter slightly less than that of the internal cylindrical surface 19 of the bearing housing, as it is necessary to insert the driving gear into the gear housing through the cylindrical surface 19, if it is desired to form the connection between the driving gear 24 and the motor shaft 4 external of the geared power unit. In that case the assembly of the geared power unit may take place as follows: The housing member 8 may first be secured to the stator, after which, the rotor, the motor shaft, and the driving pinion may be inserted into place through the stator bore from the opposite end of the stator. The bearing cap 21 and the bracket member 7 may then be secured in position. The load driving shaft together with the driven gear and the supporting bearings may then be inserted in to position through the aperture provided by the removable cover 16, as illustrated by Figure 2. The oil slinger 44 may then be secured to the end of the driving gear, after which, the removable cover 16 may be secured into position.

If it is desired to employ a driving gear having a diameter greater than that of the bearing 6, the driving gear 24 may be mounted on an extending portion of the motor shaft in the same manner as the driven gear 25 is mounted on the load driving shaft. It is obvious from the construction, as illustrated by Figure 2, that the diameters of the driving and driven gears may be varied between wide limits to obtain the required speed at the load driving shaft; as the aperture provided by the removable cover 16 provides means whereby the gears may be inserted in position irrespective of whether the driving or the driven gear has the greater diameter.

As has been previously noted, the bracket member 7, Figure 1, is provided with the air intake passage 9 and the air deflector 10. The housing member 8 is likewise provided with the air intake passage 72 and the air deflector 73. To produce the motor ventilation the rotor 3 is provided with the fans 74, placed on either end of the rotor and which draw air into the motor structure through the air passages and air deflectors formed in members 7 and 8. The air is directed by the fans 74 over the stator winding 75 and into the air passage 76 formed between the external periphery of the stator laminations 77 and the removable stator cover 78. The air passes over the stator lamination along the passage 76 and is discharged from the motor structure at either side of the stator through the air discharge passage 79, formed between the removable cover 78 and the stator feet, as well as through the downwardly directed air discharge passages 80 formed in the removable cover 78. By means of this construction the motor is protected against falling liquid, as the air intake passages as well as the air discharge passages are formed with downwardly directed openings. The construction provided is of particular utility as air is drawn in from both ends of the motor structure and discharged at the center, thereby maintaining the lowest possible operating temperature within the motor structure as well as within the gear housing.

Figure 5:
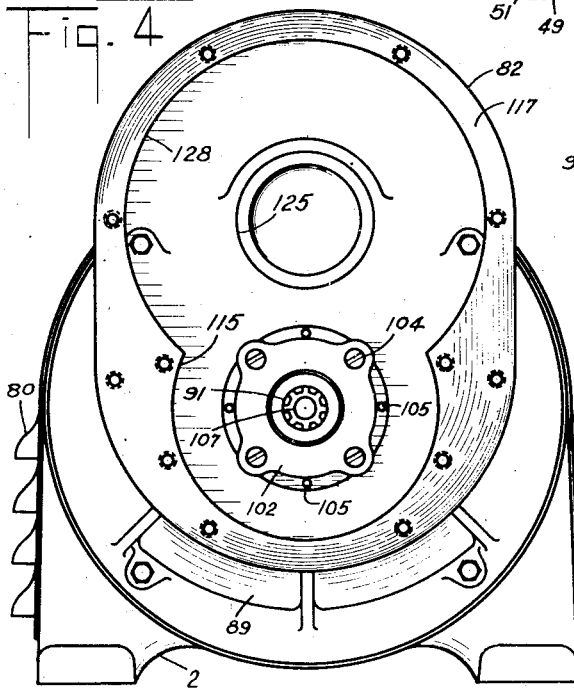
Figure 5 is an end elevation of the geared power unit of Figure 4, taken from the right hand side, and with the cover of the gear housing and the load driving shaft removed. This view illustrates the bearing locating surfaces which are provided for accurately determining the correct center distance and the accurate parallel relationship of the axes of the mating gears.
Figure 6:
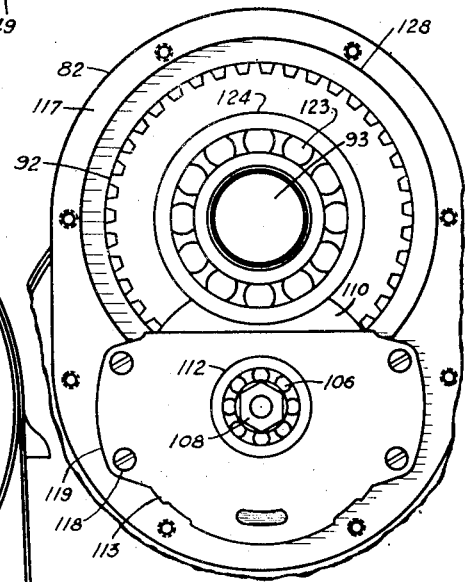
Figure 6 is an end elevation, similar to that of Figure 5, but with only the cover of the gear housing removed.

Figures 4 to 6 illustrate another form of the geared power unit of Figure 1. In this form means are provided for obtaining an increased reduction in speed between the motor shaft and the load driving shaft. The construction of Figures 4 to 6 may be the same as that of Figures 1 to 3 except for the differences which will be noted. In the form of Figure 4 the motor shaft, and housing member 8 of Figure 1 are replaced by the motor shaft 81 and the housing member 82, which together with the removable cover 83 forms the gear housing 84. The housing member 82 may be supported on the stator 2 in the same manner as the housing member 8 of Figures 1 to 3. Thus the member 82 is provided with the external cylindrical surface 85 and the radial surface 86 which correspond to the external cylindrical surface 48 and the radial surface 50 of the member 8. The housing member 82 is secured to the stator by means of the bolts 133, which pass through the member 82 and which are threaded into the stator. A plurality of the bolts 133 may be provided so that the angular position of the gear housing can be changed with respect to the stator to provide different angular positions of the load driving shaft with respect to the motor frame.

The member 82 is also provided with the internal cylindrical surface 87, formed coaxial with the cylindrical surface 85, and which forms a support for the bearing 88, which displaces the bearing 6 of Figure 1. To provide a bearing having an increased capacity for radial load and a small external diameter a double row bearing may be employed for the bearing 88. The member 82 is also provided with the air intake passage 89 and the air deflector 90 for the motor ventilation.

The motor shaft 81 is in coaxial driving relation to the driving pinion 91, which drives the driven gear 92, mounted on the load driving shaft 93. In this form the bearing 88 is mounted directly on the shank 94 of the driving pinion and is held in place between the shoulder 95, formed on the pinion shank, and the end of the motor shaft. The shank of the driving pinion projects into the cylindrical chamber 96 formed in the end of the motor shaft and is provided with the portion 97, having an external cylindrical surface of slightly greater diameter than the remaining portion of the shank, which engages the internal surface of the cylindrical chamber 96 to form a press fit between the pinion shank and the motor shaft. The portion 97 of increased diameter is preferably of relatively short length so that although the motor shaft is maintained in accurate coaxial relation to the bearing 88, nevertheless, the driving pinion is not rigidly fixed in angular position by this fit; but is free to move through a small angle if necessary. The driving pinion is held in place by means of the set screw 98, which passes through the motor shaft and which engages the conical shoulder 99 formed on the pinion shank to urge the pinion shank farther into the cylindrical chamber 96. The driving connection between the motor shaft and the pinion shank is formed by the key 100 which is similar to the key 60 of Figure 3.

The bearing 88 is axially fixed with respect to the member 82 by means of the bearing caps 101 and 102. The bearing cap 102 also serves to prevent the entrance of excessive lubricant into the bearing housing, for this purpose the bearing cap is provided with the extending lip 103 which comes almost into contact with the pinion. The bearing caps 101 and 102 are held to the housing member 82 by means of screws 104, which pass through the bearing cap 102 and the member 82, and which are threaded into the bearing cap 101. In order to prevent lubricant from accumulating within the bearing housing, lubricant returning passages 105 are provided, which return the lubricant to the gear housing. As illustrated by Figure 5, a plurality of these passages may be provided for returning the lubricant to the gear housing irrespective of the particular position in which the geared power unit is mounted.

In addition to the bearing 88, the pinion is provided with the bearing 106 for supporting the other end of the pinion. The bearing 106 is removably mounted on the cylindrical surface 107 of the pinion and is held in place between the locknut 108 and the shoulder 109 formed on the pinion, the oil slinger 110 and the collar 111 being interposed between the bearing and the shoulder 109. The axial position of the motor shaft and of the pinion is fixed by the bearings 5 and 88, thus the bearing 106 has to be supported only for a radial load. To provide this support bearing 106 is supported by the internal cylindrical surface 112 formed on the removable bearing supporting plate 113. The bearing supporting plate 113 is in turn supported on the member 82 by the engagement of the external cylindrical surface 114, formed on the plate coaxial with the internal cylindrical surface 112, with the internal cylindrical surface 115, formed on the housing member 82. The axial position of the bearing supporting plate is determined by the contact of the radial surface 116, formed on the member 113, with the radial surface 117 formed on the member 82. The internal cylindrical surface 115 is formed coaxial with the cylindrical surfaces 85 and 87, thereby supporting the pinion coaxial with the motor shaft. The coaxial relation of the cylindrical surface 115 with the pinion is best illustrated by Figure 5, which is a view of the interior of the gear housing with the load driving shaft and the bearing supporting plate 113 removed.

The means provided for securing the bearing supporting plate 113 to the housing member 82 is best illustrated by Figure 6, which is a view of the interior of the gear housing with only the cover 83 removed. The plate 113 is secured to the member 82 by the screws 118, which pass through the ears 119 of the plate 113, and which are threaded into the member 82.

The driven gear 92 is pressed on to the cylindrical surface 120 formed on the load driving shaft and against the shoulder 121, the key 122 being provided to form the driving connection between the gear and the load driving shaft. The load driving shaft is rotatably supported by the bearings 123 and 124, which are respectively supported by the cylindrical surfaces 125 and 126 formed on the member 82 and the removable cover 83. The cylindrical bearing supporting surface 126 is supported in coaxial relation to the bearing supporting surface 125 by the engagement of the external cylindrical surface 127, formed on the removable cover, with internal cylindrical surface 128, formed on the housing member 82, the mating cylindrical surfaces 127 and 128 being respectively formed coaxial with the cylindrical surfaces 126 and 125. The coaxial relation of the cylindrical surface 128 with the bearing supporting surface 125 is best illustrated by Figure 5.

The axial position of the removable cover is determined by the contact of the radial surface 129, formed on the cover, with the radial surface 117, formed on the housing, the cover being secured to the housing by means of bolts 130, which pass through the cover and which are threaded into the housing member. The contact of the radial surfaces 129 and 117 serves to prevent leakage of the lubricant from the gear housing. The bearing cap 101 is provided with the lubricant retaining seal 131 to prevent the escape of the lubricant into the motor structure and the removable cover 83 has the lubricant returning passages 132 formed therein for returning the lubricant to the gear housing, which escapes past the bearing 124.

It is obvious from the construction of Figures 4 to 6 that the axis of rotation of each of the gears is positively determined by the means of adequate supporting surfaces, and that the gears can be entered into or removed from the assembly of the geared power unit without the necessity of removing them from their supporting members. Thus, the removable cover 83 may be removed to give access to the gear members, as illustrated by Figure 6. Referring to Figure 6; it is obvious that the removal of cover 83 gives access to the screws 118 which hold the bearing supporting plate 113 to the flange forming the surface 117. The bearing supporting plate may be removed by removing the screws 118, after which the locknut 108 may be removed to permit the withdrawal of the oil slinger 110 and the collar 111. With these members removed, the load driving shaft together with the driven gear 92 and the supporting bearings 123 and 124 may be removed through the aperture provided by the internal cylindrical surface 128, thus leaving only the driving pinion 91 in the gear housing, as illustrated by Figure 5. To remove the driving pinion 91, it is only necessary to remove the screws 104, which hold the bearing caps 101 and 102 in place, after which, the driving gear together with the rotor and the motor shaft may be removed through the stator bore. It is thus obvious from the construction that the gear members may be entered into or removed from the assembly of the geared power unit together with their supporting means. This construction precludes the possibility of the gears becoming loose on their shafts and thereby assures that the gear members will always be maintained in the required relation to each other.

Figure 7:
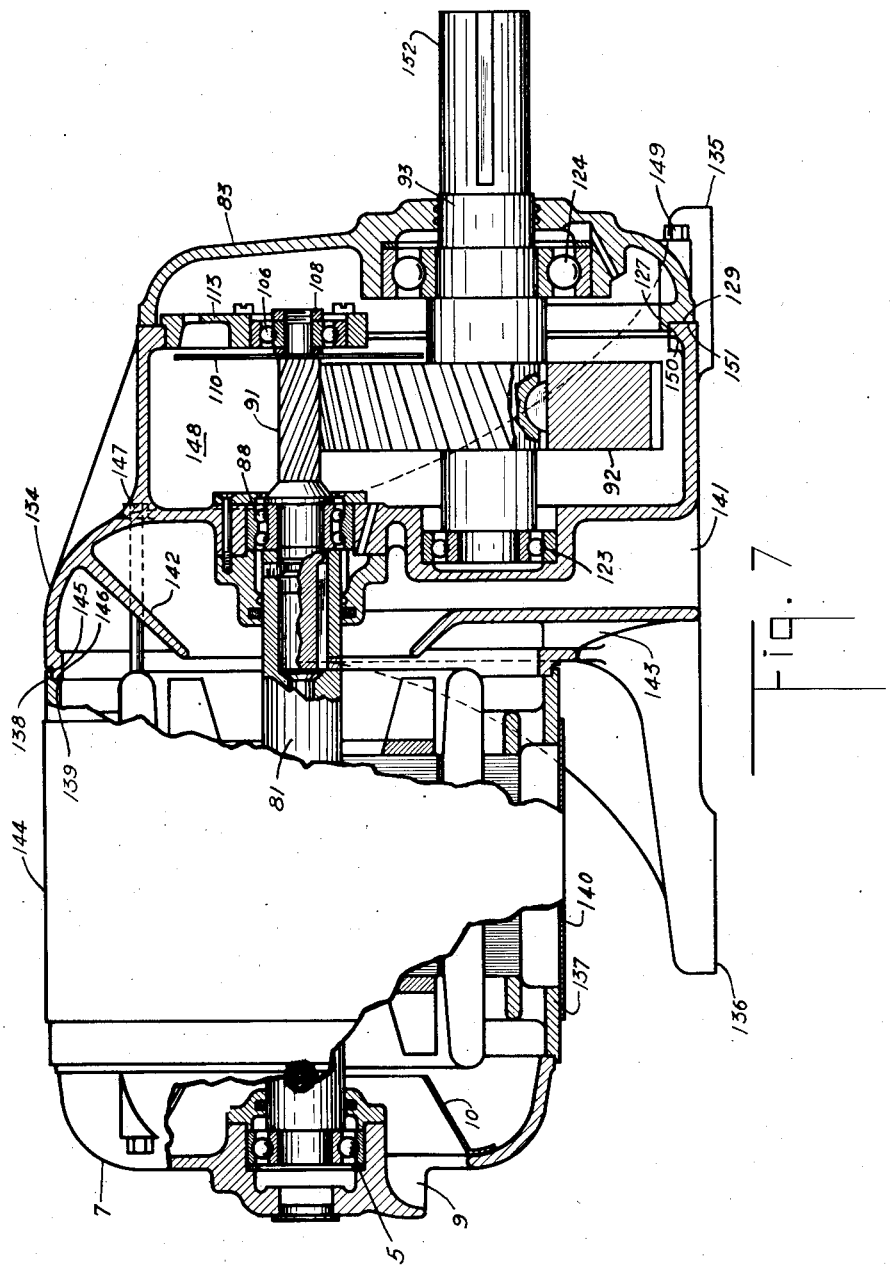
Figure 7 is a side elevation of another form of the geared power unit of Figures 4 to 6. This view is partly in section, taken along the axis of the motor shaft.
Figure 8:
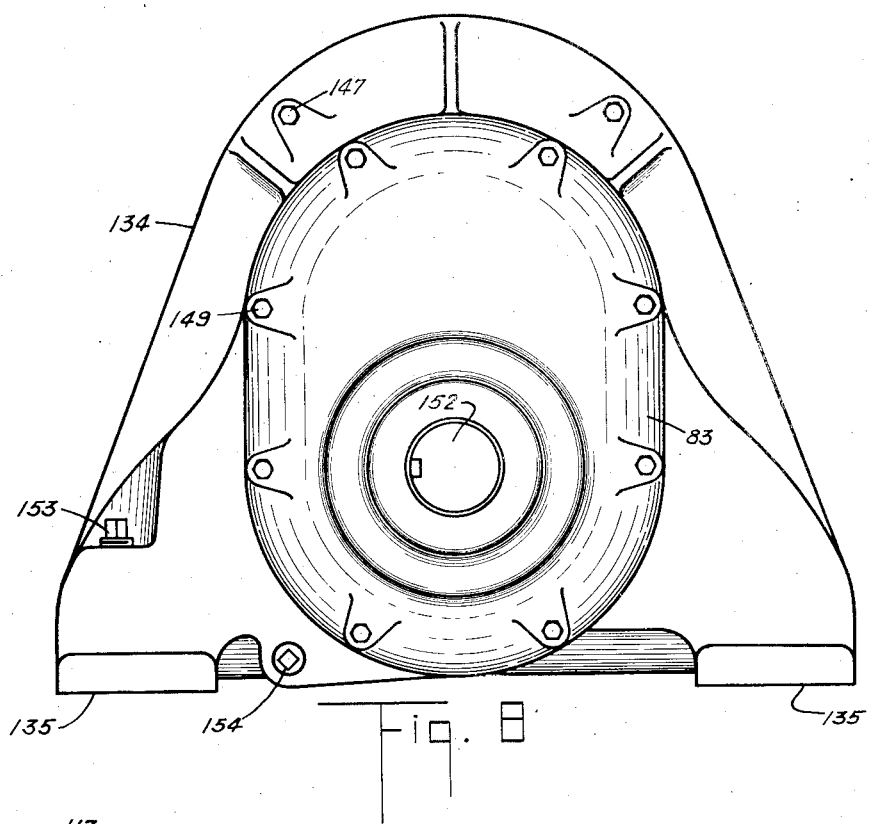
Figure 8 is an end elevation of the geared power unit of Figure 7, taken from the right hand side.

Figures 7 and 8 illustrate a modified form of the geared power unit of Figures 4 to 6. Figure 7 is a side elevation of power unit and Figure 8 is an end view taken from the right hand side of Figure 7. The geared power unit of Figures 7 and 8 may be of the same form as that of Figures 4 to 6 except for the differences which will be noted. In this form the housing member 82 of Figure 4 is replaced by the housing member 134, which also forms a common support for the gear housing and for the driving motor. For this purpose the housing 134 is provided with feet 135, which project beneath the load driving shaft, and with the feet 136 which project under the driving motor 144. Thus the housing member 134 forms a pyramid type of support for the entire unit. In this form the stator 2 of Figures 1 to 6 is replaced by the stator 137, which is provided with the internal cylindrical surface 138 and the radial surfaces 139, which are similar to the internal cylindrical surface 49 and the radial surface 51 of the stator of Figures 1 to 6. The motor may also be provided with the end bracket 7, the rotor 3, and the motor shaft 81, which are of the same form as those of Figure 4. However, the removable stator cover 78 is replaced by the removable stator cover 140, which may enclose the entire periphery of the stator. Thus in this form the motor ventilation may be maintained by means of the ventilating passages provided in the end brackets 7, and by the air intake passage 141, the air deflector 142, and the air discharge passage 143, formed in the member 134. Thus by means of the construction provided the motor is both drip-proof and splash-proof.

The motor 144 is supported on the housing member 134 by the engagement or mating of the internal cylindrical surface 138 and the radial surface 139, formed on the stator, with the external cylindrical surface 145 and the radial surface 146, formed on the housing member 134. These surfaces may in every way be identical with the corresponding surfaces 85 and 86 of member 82 of Figures 4 to 6. The stator is suitably secured to the supporting member by means of the bolts 147, which pass through the supporting member and which are threaded into the stator.

The supporting member 134 together with the removable cover 83 form the gear housing 148, in which are supported the driving gear 91 and the driven gear 92, which may in every way be similar to the corresponding gears of Figures 4 to 6. Likewise, the driving gear and the motor shaft may be rotatably supported by means of the bearings 88 and 106 as in Figure 4. The load driving shaft 93 may also be rotatably supported by the bearings 123 and 124. The removable cover may be suitably secured to the supporting member 134 by means of the bolts 149, and may be located with respect to the supporting member by means of the internal cylindrical surface 150 and the radial surface 151 which engage the corresponding surfaces 127 and 129 formed on the removable cover.

The construction illustrated by Figures 7 and 8 is of particular utility in connection with drives in which it is desired to mount a gear or a chain drive on the load driving extension 152 of the load driving shaft. Gear or chain drives of this type produce a torque on the load driving shaft tending to rotate the entire structure of the geared power unit, as well as a direct radial pull on the shaft which tends to twist the geared power unit on its supporting feet. By means of the strong support provided by the feet 135 and 136 of the supporting housing, the geared power unit may be rigidly supported adjacent to the load driving shaft, thereby decreasing the reactive torque applied to the frame of the geared power unit, as well as removing the resultant stress from the motor structure, which in the case of general purpose electric motors the motor is not designed to withstand.

Figure 8 is an end view of the geared power unit of Figure 7, taken from the right hand side of Figure 7, and illustrates the rigid support provided for the geared power unit by the supporting structure. The feet are well spread and thus reduce to a minimum the stress transmitted to the supporting foundation. This view also illustrates the means provided for replenishing the supply of lubricant within the gear housing. For this purpose the removable pipe plug 153 is provided, which is threaded into the member 134 to provide a lubricant intake passage to the gear housing. To provide means for draining the used lubricant from the gear housing, the drain plug, 154 is provided at the bottom of the gear housing.

Figure 9:
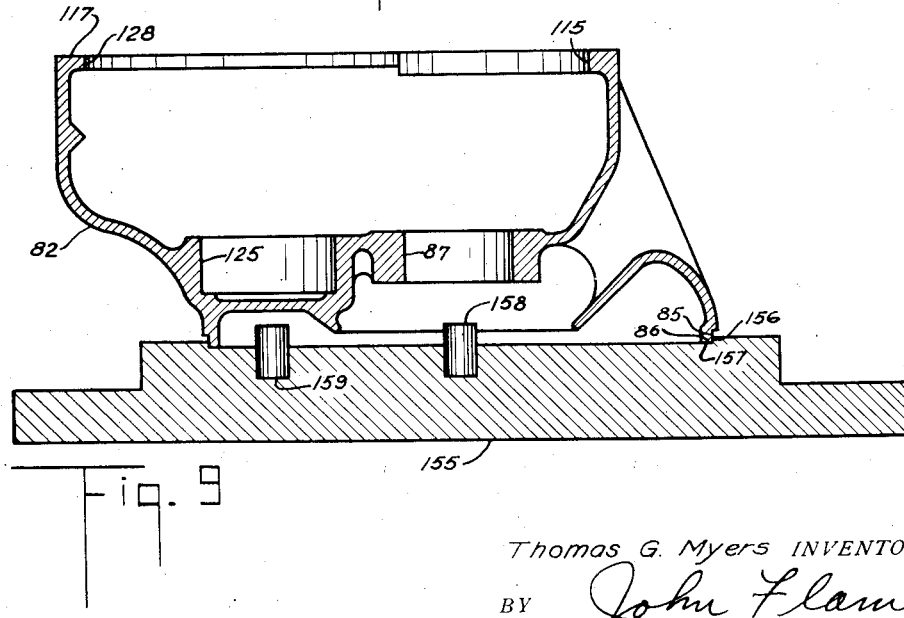
Figure 9 illustrates the construction of the geared power unit, which enables the gear locating surfaces to be accurately formed.

It has been stated to be an object of this invention to provide a geared power unit in which the bearing locating surfaces for each of the gear members may be formed at a single setting of the gear housing in the proper cutting machine, and in which the surfaces determining the relative locations of the mating gears may be accurately formed in the required relative positions without the necessity of taking measurements on the gear housing during the forming of these surfaces. The manner in which this object may be accomplished is illustrated by Figure 9, which illustrates in particular how the bearing locating surfaces of the housing member 82, of Figure 4, may be formed. The member 82 is first set up in a lathe or boring mill and has the stator engaging surfaces 85 and 86 formed thereon. This process may be repeated on as many of the housings as it is desired to machine in a single group. Either the surfaces 125 and 128 which determine the location of the driven gear, or the surfaces 87 and 115 which determine the location of the driving gear may be formed next. To form these surfaces the housing member 82 is supported on the master plate or jig 155, and is located with respect to this plate by the engagement of the cylindrical surface 85 and the radial surface 86 respectively with the cylindrical surface 156 and the radial surface 157, formed on the plate. The surfaces 156 and 157, formed on the plate, are in every way equivalent to the surfaces 49 and 51, formed on the stator of Figure 4. The plate 155 has secured thereto the cylindrical pins 158 and 159, with their axes perpendicular to radial surface 157. The pin 158 is located coaxial with the cylindrical surface 156 and the pin 159 is so located that the center distance between the axes of the pins 158 and 159 is exactly equal to the required center distance between the driving and driven gears.

Assuming that it is desired to machine the supporting surfaces 87 and 115 of the driving gear, the plate 155 is secured to the rotating head of a lathe or boring mill so that the axis of rotation of the machine is coaxial with the cylindrical pin 158 and perpendicular to the radial surface 157. This is readily accomplished by the aid of the finished surface of the pin 158. The housing member 82 is then supported on the plate 155, as illustrated, and is suitably secured in any desired manner, either directly to the rotating head of the machine, or to jig 155. It is obvious that with the member 82 so supported, each of the radial surfaces, formed on the member, will be formed parallel to the radial surface 86 and that each of the cylindrical surfaces machined with this set up will be formed coaxial with the cylindrical surface 85. Thus the cylindrical surfaces 87 and 115 may be formed to the required diameters with the positive assurance that they are located in the required coaxial relation with the cylindrical surface 85. The plate 155 may be left located in this position until the surfaces 87 and 115 have been formed on all of the housings in the group.

After this machining operation is completed, the housing 82 is removed and the plate 155 may then be moved to the position at which the axis of rotation of the machine is coaxial with the cylindrical pin 159 and perpendicular to the radial surface 157. The housing member may then again be supported on the plate, as illustrated, and may be rotated with respect to the plate 155 so that those parts of member 82 which are now to be machined will overlie the pin 159. The housing member may then be secured to the rotating head of the cutting machine in this position. The cylindrical surfaces 125 and 128 may then be formed to the required diameters and the radial surface 117 may be formed at the required distance from the radial surfaces 86 and 157. As plate 155 was positioned in the cutting machine so that the surfaces cut would be concentric with pin 159 and perpendicular to surface 157, the driven gear will be located positively by these surfaces with its axis parallel to and at the correct center distance from the axis of the driving gear. The plate 155 may be left supported in this position until the machining of all of the housings in the group is finished.

It is thus obvious that the difficult and uncertain measurements commonly associated with the construction of gear housings are obviated by means of the construction disclosed. The housing member 134 of Figures 7 and 8 may be machined in the manner illustrated by Figure 9. The housing member 8 of Figures 1 to 3, may have the locating surfaces 19, 48 and 50 formed at a single setting of the member in a lathe or boring mill, after which the surfaces 28, 32, and 33 may be formed with the member supported on a master plate in the manner illustrated by Figure 9.

I claim:

In a geared power unit, a motor having a frame and a shaft, a load driving shaft, means forming a gear transmission for transmitting power from the motor shaft to the load driving shaft, a housing for said transmission, and secured to the frame of the motor, means in said housing forming an air intake passage to said motor, and means in said housing permitting air to be discharged from said motor.

THOMAS G. MYERS.